April 11, 1933.    G. O. WILMS    1,903,491
MOTOR PROTECTIVE APPARATUS
Filed May 14, 1928    3 Sheets-Sheet 1
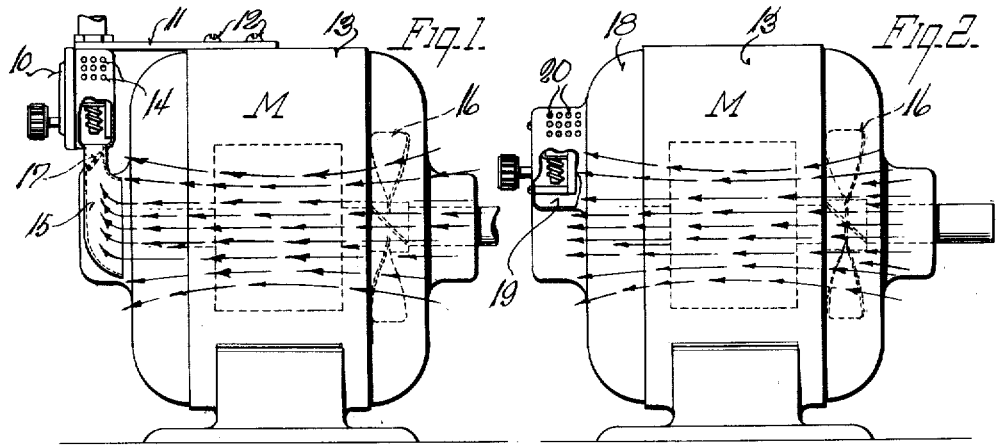
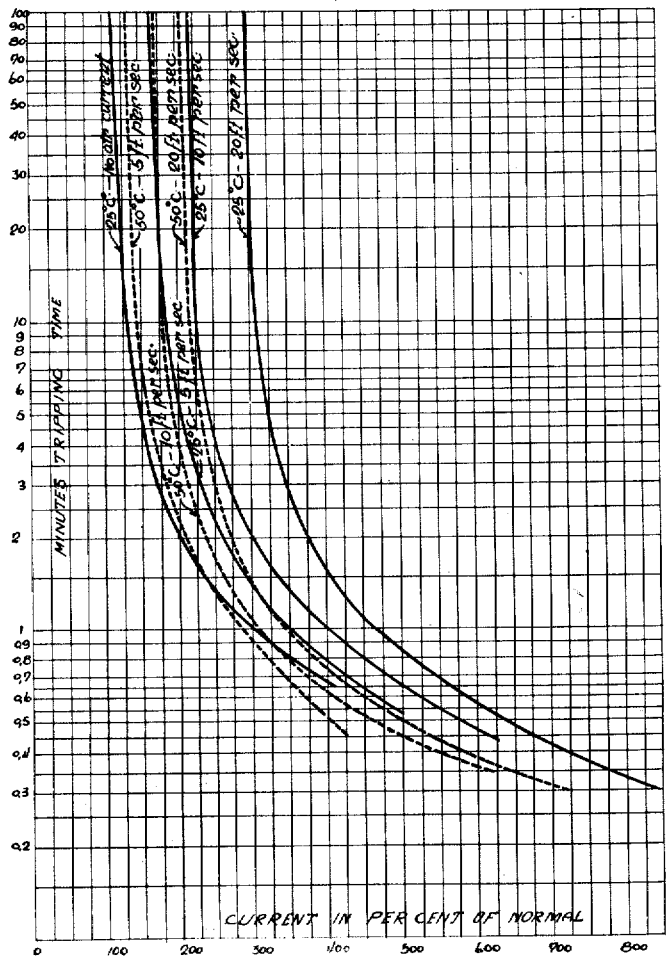
Inventor
Gustav O. Wilms
By Hamilton Jones
Attorney April 11, 1933. G. O. WILMS 1,903,491
MOTOR PROTECTIVE APPARATUS
Filed May 14, 1928 3 Sheets-Sheet 2
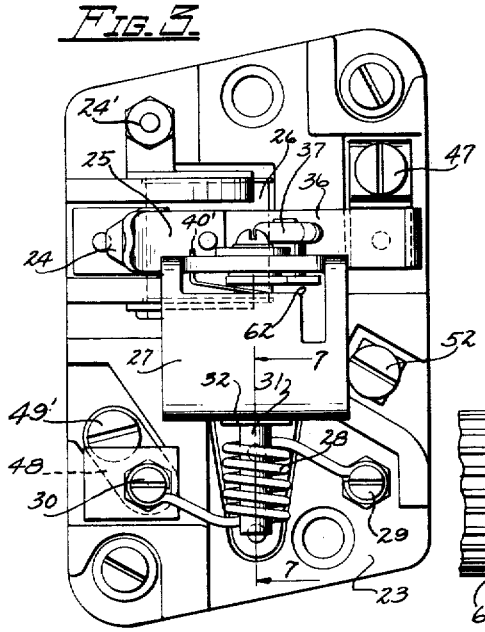
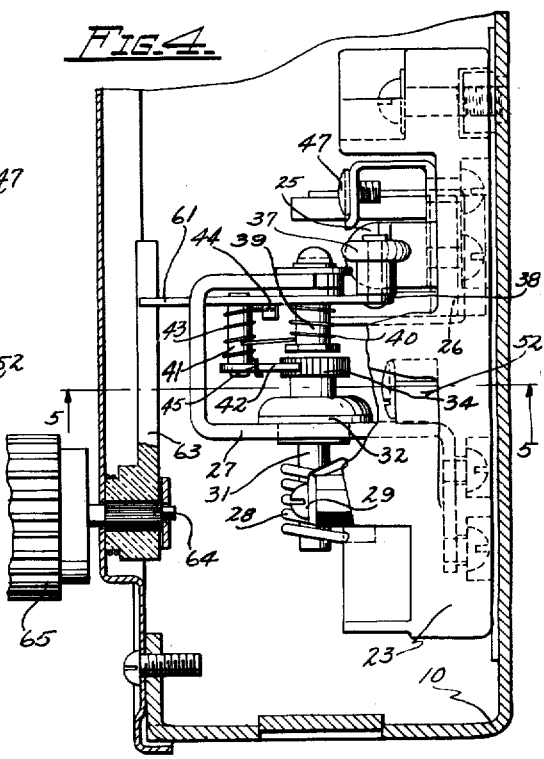
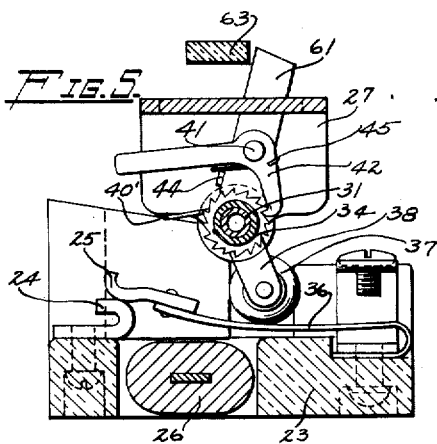
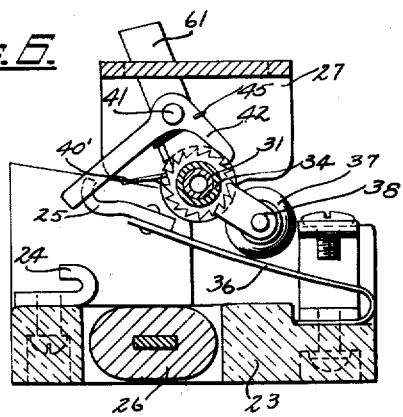
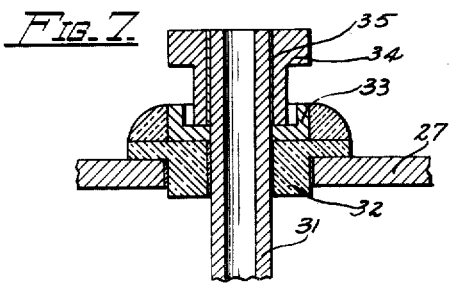
INVENTOR.
Gustav O. Wilms
BY
Quarles & French
ATTORNEYS

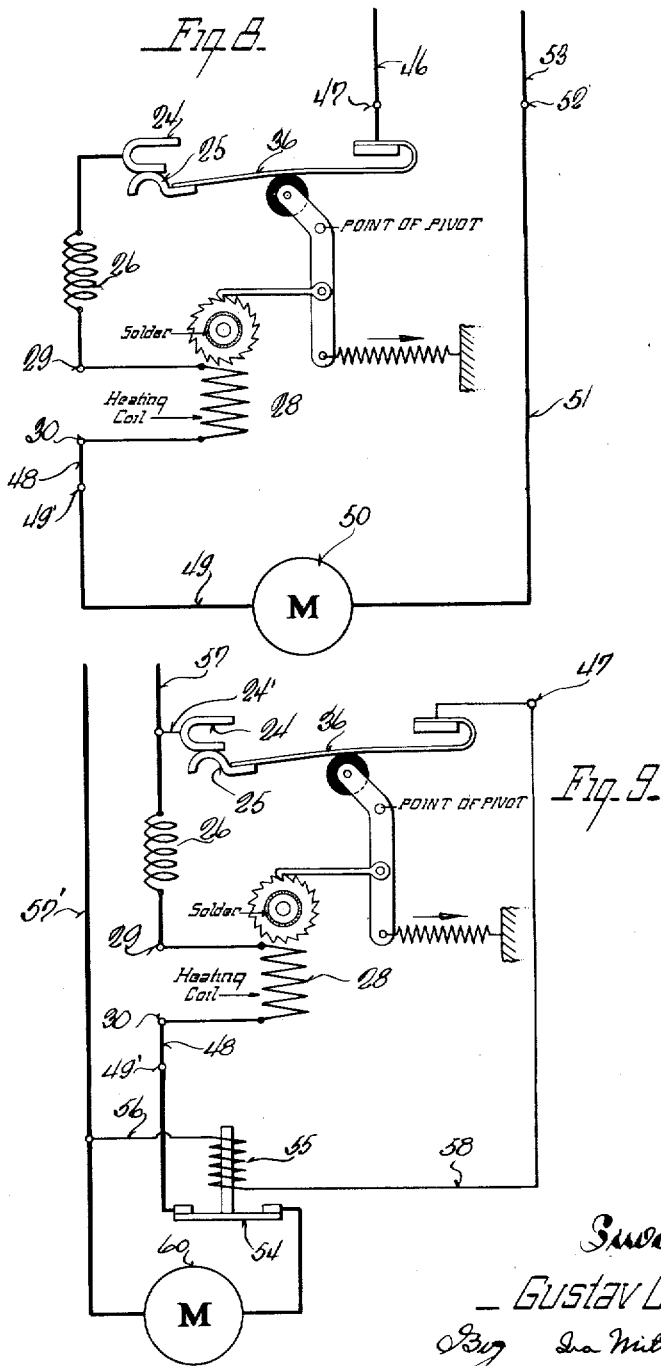

Patented Apr. 11, 1933

1,903,491

UNITED STATES PATENT OFFICE

GUSTAV O. WILMS, OF MILWAUKEE, WISCONSIN, ASSIGNOR, BY MESNE ASSIGNMENTS, TO ALLEN-BRADLEY COMPANY, OF MILWAUKEE, WISCONSIN, A CORPORATION OF WISCONSIN

MOTOR PROTECTIVE APPARATUS

Application filed May 14, 1928. Serial No. 277,446.

This invention relates to certain new and useful improvements in protective devices for electric motors.

In all motors, it is desirable to cut off the current supply within a predetermined short period of time if the motor fails to start and to cut off the supply of current upon the occurrence of excessive overloads while the motor is in operation. There are thus two conditions under which the motor must be protected against burning out, and ordinarily a protective device which is efficient under one of these conditions is entirely inadequate under the other. Separate devices might, of course, be provided to satisfy each condition, but such an installation would be too costly and complicated for most motors upon which protective devices are most needed.

The need for economical protection particularly prevails in connection with house appliance and similar motors, as due to price competition the manufacturers resort to every possible economy and consequently the mass of material in the motors which controls their ability to withstand overheating is reduced to a minimum, thus practically eliminating a greater portion of the safety factor. Therefore, protective devices capable of affording ample protection against overloads during normal operation do not protect the motor at its initial start.

It is, therefore, an object of this invention to provide a novel protective apparatus which affords ample protection for a motor against burning out, both during the starting cycle and during the time the motor is in operation.

A further object of this invention resides in the provision of means for modifying the action of a motor control device so that a single apparatus which is set to cut off the supply of current to the motor upon failure of the motor to start, also provides the desired protection for the motor during its running condition.

Another object of this invention resides in the provision of improved and novel means for protecting an electric motor against overloads, in which a protective device in the motor circuit is associated with the motor in such a manner as to have its action coordinated with the condition of the motor.

And a more specific object of this invention resides in the provision of a thermally responsive overload protective device for electric motors and the like, which operates or trips to disconnect the motor from its source of supply when the temperature at a fusible element reaches a predetermined degree, and the attainment of which is dependent upon not only the current flowing to the motor, but also to certain factors dependent for their existence upon the condition of the motor, i. e. whether the motor is at rest, is accelerating to its normal speed, or is operating at its normal speed.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated two complete examples of the physical embodiment of my invention constructed according to the best modes I have so far devised for the practical application of the principles thereof, and in which:

Figure 1 is an elevational view of a motor equipped with my improved control apparatus;

Figure 2 is a view similar to Figure 1 illustrating a modified application of this invention;

Figure 3 is a front elevational view of a circuit control apparatus that may be used as part of this invention;

Figure 4 is a side elevational view of the control apparatus;

Figure 5 is a detail sectional view taken on the plane of the line 5—5 of Figure 4, showing the motor control switch closed;

Figure 6 is a view similar to Figure 5 showing the switch open;

Figure 7 is a detail sectional view taken on the plane of the line 7—7 of Figure 3;

Figure 8 is a view illustrating diagrammatically the wiring circuit of a typical installation;

Figure 9 is a view similar to Figure 8, diagrammatically showing another arrangement of circuits; and Figure 10 is a chart illustrating graphically the operation of the control apparatus.

The motor control apparatus of this invention is of the thermal type and may be connected directly in the motor circuit itself or in a circuit controlling a switch in the motor circuit. In each instance the control apparatus acts to protect the motor against overheating and consequent burn-outs if it fails to start, and is so associated with the motor as to be influenced by air currents incidental to the operation of the motor, which retard the action of the control apparatus and prevent its tripping during normal running of the motor while providing positive protection against overheating in the event of overload conditions imposed on the motor while the same is in operation.

The air currents may be derived from a fan or other similar structure, not shown, driven in any suitable manner by the motor or may be the ventilating air set in motion by the usual rotor carried fan to carry off the heat generated by the motor, the latter being preferable.

Any suitable control apparatus may be employed, but it is desirable that the tripping of the unit be effected by the response of a thermally responsive element to an increase in temperature; and the unit is so associated with the motor that the currents of ventilating air discharged therefrom pass over the same, and in Figures 1 and 2 two typical installations are shown.

Referring now more particularly to the accompanying drawings, and especially to Figure 1, the housing 10 of the control unit or apparatus is mounted by a bracket 11 and screws 12 from the casing or housing 13 of a motor M to be controlled, the housing 10 having inlet openings 14 at its upper end and a flared funnel shaped inlet pipe 15 secured to and communicating with its lower end, the flared opening of the inlet pipe being disposed in the path of the ventilating air currents, indicated by the arrows and produced by a fan or fans 16 carried by the rotor. A portion of the currents of air are thus directed upwardly into the housing 10 to flow over the control unit mounted therein and modify its functioning in a manner to be later described. If desired, a throttle valve 17 may be mounted in the pipe 15 to control the amount of air passing to the interior of the control unit housing 10.

The method of installation above described enables the application of this invention to motors already in use, but the housing of the control unit may also be built in, or form part of, the motor housing as illustrated in Figure 2. In this embodiment, one of the end plates 18 of the motor is provided with an enclosure 19 which takes the place of the housing 10 in the modification illustrated in Figure 1, and has the control unit mounted therein. The currents of ventilating air pass directly from the interior of the motor to the lower portion of the enclosure 19 and flow over the control unit to be exhausted through openings 20 in the upper portion of the enclosure 19.

As stated, any suitable thermally operated control unit or apparatus may be employed, and Figures 3 to 7 inclusive, illustrate a unit or apparatus which has been found to be particularly well adapted to the present purpose. The unit comprises a base of insulating material 23 carrying a fixed contact 24 and a movable spring contactor 25 engageable therewith. A magnetic blow-out coil 26 is also provided and a substantially U shaped frame 27 is secured to the base to mount the control mechanism.

A thermal or heating element 28 which, in the present instance, is a small coil of resistance wire, is secured at its ends to binding posts 29 and 30 and has its intermediate portion coiled about a heat conducting member in the form of a copper tube 31, a thin coating of insulation applied to the resistance wire insulating the same from the copper tube in the event of accidental engagement therewith.

The tube 31 is supported in the lower leg of the U shaped frame 27 by a flanged washer 32 of lava or other suitable heat insulating material cemented respectively to the tube and frame, and an annular flanged disc 33 is driven onto the tube above which a ratchet wheel 34 of suitable metal is normally held to the tube by a thermal responsive or fusible material 35, such as solder.

The spring arm 36 of the movable contactor 25 is engaged by an insulated roller 37 carried at one end of a lever 38 from which a shaft portion 39 extends to be pivotally mounted and supported in the upper leg of the U shaped frame 27 in axial alignment with the tube 31, the lever 38 being normally urged to a position releasing the movable switch 25, by means of a coiled spring 40 one end if which 40' engages the frame and the other end of which engages a pin 41 mounted on said lever and carrying a pivoted pawl 42. The pawl 42 is engageable with the ratchet wheel 34 to normally hold the lever 38 in switch closing position, the pawl being urged to engagement with the ratchet wheel by a coil spring 43 one end of which engages a projection 44 on the lever 38 and the other end 45 of which engages the pawl.

The heat of the coil 28 is conducted by the tube 31 to the solder 35 and when excessive current passes through the coil the solder melts and releases the ratchet wheel 34 to release the spring 40 which in turn causes the lever 38 to move from its position maintaining the movable switch closed as shown in Figure 5 to a position allowing the switch to open, as shown in Figure 6.

As hereinbefore brought out, the control unit may be connected directly in the motor circuit or may form part of a motor control circuit, and in Figure 8 a typical wiring diagram is shown wherein the control unit is connected directly in the motor circuit. In this disclosure one of the supply lines 46 is shown leading to a terminal 47 of the unit, which is connected with the movable contactor 25 through its spring 36. The movable contactor 25 is normally engaged with the fixed contact 24 which has one end of the blow-out coil 26 connected therewith, the other end being connected with the binding post 29 to which one end of the heating coil 28 is also connected, and the other end of the heating coil being connected by the post 30, a conductor 48, a terminal 49', and a conductor 49 to one side of the motor 50. The other side of the motor is connected to a terminal 52 with which the other side of the supply line 53 connects. The switch afforded by the contacts 24 and 25 and the heating coil 28 is thus arranged in series with the motor.

In motors of the larger type, it is desirable that the switch comprising the contacts 24 and 25 form part of a control circuit as shown in Figure 9. In this arrangement, a magnetic switch 54 is provided to connect the motor with its source of current supply, and for simplicity the switch is illustrated as a conventional relay interposed in one of the lines 57 leading to the motor 60, the other line 57' being connected directly with one side of the motor. In series with the line 57 is the blow-out coil 26, the heating coil 28, and the conductor 48 leading from binding post 30 to a terminal 49'.

The holding coil 55 for the magnetic switch 54 is connected at one end through a conductor 56 with the supply line 57 and at its other end through a conductor 58, with the terminal 47 and the movable contactor 25. The stationary contact 24 is connected with the other supply line 57 by a conductor 24'. The switch afforded by the contact 24 and the contactor 25 and the holding coil 55 thus forms part of a shunt circuit across the supply lines and controls the switch 54 in the motor circuit.

To re-set the unit after it has tripped, the free end 61 of the lever 38 projects through an opening 62 in the frame 27 and is adapted to be engaged by a re-setting arm 63 fixed to the inner end of a shaft 64 projecting through the housing 10 in Figure 1, or the enclosure 19 in the embodiment illustrated in Figure 2, to carry an actuating knob 65 on its exposed end whereby the lever 38 may be moved back to its position with the pawl engaging the ratchet wheel 34 when the parts have cooled to the extent necessary to re-set the solder 35.

The foregoing description defines one specific type of control unit which may be employed in carrying out my invention, and the operation thereof will now be described.

For an overload protective device to properly protect a motor against overheating and consequent burn-out, it is necessary that the device must function, or act, in step with the temperature of that part of the motor subject to a burn-out, and the time at which the device operates or trips to disconnect the motor from its source of supply must be before the motor winding or other part has reached a dangerous temperature.

Heretofore, protective devices for motors have been responsive only to an increase in current passing to the motor as a result of an overload condition. It was, therefore, impossible to provide a sensitive control to protect the motor both during its starting cycle and after the same had come to speed. In motors where it was possible to employ sufficient active material to withstand unusually large overheating, sensitive control was not absolutely necessary in that the surplus material provided a sufficient factor of speed. However, most motors, to meet price competition, have a considerably smaller factor of safety with respect to the degree of overheating they can stand before burning out.

Such motors, however, are not of any one particular type although alternating current single phase motors which are provided with a starting and a running winding are probably more in need of sensitive overload protection than any other type of motor, and for this reason this invention is particularly well adapted to the protection of such motors. It is to be understood though, that this invention is equally applicable to many other types of motors.

Generally, motors of the alternating current single phase type which have a winding operative during the starting cycle and another winding operative during the starting and running cycles, are inadequately protected by the ordinary thermal control devices heretofore employed, i. e. those which function according to line current flowing and subject to radiation in ambient temperature. Such protective devices protect the running winding, but do not act quick enough to protect the starting winding in case the motor fails to start within a predetermined time or to come to speed within a predetermined time. In other words, the protective devices heretofore employed kept in step with the running winding, but not with the starting winding.

The current flowing to the starting and running windings with the rotor at a stand-still is about two and three-quarters times normal and under this condition the starting winding can remain in circuit but about thirty seconds before reaching a dangerous temperature.

The present invention protects a motor both during its starting and running cycles by calibrating the heating element 28 with a resistance such that an abnormal flow of current therethrough during starting of the motor, when the rotor is at a stand-still, quickly raises the temperature at the solder or thermal responsive element to the degree at which it melts to effect opening of the motor circuit, and by modifying or retarding the action of the heating element by means of the currents of ventilating air while the motor is in operation.

At the initial start of the motor, its rotor is obviously at a stand-still and no air currents pass over the control unit. It, therefore, follows that the temperature at the thermal responsive element or the solder 35 is governed entirely by the functioning of the heater coil 28, which being in series with the current flowing to the motor is therefore responsive thereto and rises in temperature proportionately with the current flowing. If for any reason the motor fails to start, the current jumps up to many times its normal value so that the temperature at the thermal responsive element or solder is equally raised to its critical point by the increase in temperature of the heating element, to trip the device and cut off the motor from its source of supply before its windings or other parts reach a dangerously high temperature.

If, however, the motor starts in the proper manner upon being connected with its source of supply, the resulting operation of its rotor induces a flow of ventilating air which increases in velocity until the motor comes to speed at which time the velocity of the air current becomes constant. The passage of the ventilating air over and around the control unit, and particularly the heating coil 28, retards or modifies its action so that the temperature at the solder 35 is maintained below its critical value.

Most motors after coming to speed, maintain a substantially constant speed irrespective of varying load conditions. Hence the velocity of the ventilating air blowing across the controlling device is also constant. This condition prevents tripping during normal operation of the motor and accelerates the tripping to cut off the motor from its source of supply in the event of an overload during the time the motor is in operation.

The acceleration of the time of tripping, while the motor is in operation, is brought about by the the fact that the velocity of the ventilating air remains practically constant and if anything, drops a little, so that the temperature of the ventilating air is increased by the heating of the motor parts as a result of an overload condition. The temperature of the ventilating air thus diminishes in effectiveness as to its retarding action on the heating coil and may be said to assist the heating coil in raising the temperature at the thermal responsive element to its critical value even while the temperature of the ventilating air never exceeds that of the heating coil. The control device is thus variable to adjust itself to the different operating conditions of the motor.

The actual operation of the control device will probably be better understood from a reference to Figure 10, which shows a family of curves depicting the characteristics of the control under various conditions. From reference to this chart, it is seen that with the atmosphere surrounding the heating coil, at 25 degrees centigrade and no air currents flowing across the same, which is the condition at the initial start of the motor, an overload of 300 percent will cause the control device to trip within one minute. With the same temperature, i. e., 25 degrees centigrade and air currents moving at a velocity of five feet per second, the same overload of 300 percent requires almost one and one-half minutes to trip, and with a velocity of ten feet per second and a temperature of 25 degrees centigrade, an overload of 300 percent trips the device in two minutes, and with the air moving at a velocity of 20 feet per second approximately 40 minutes will be required to trip the control.

It is also noted from reference to Figure 10 that with the air moving at 5 feet per second and the temperature as high as 50 degrees centigrade, the tripping time is reduced only one-tenth of a second from that required when the temperature is 25 degrees centigrade and no air currents are present.

From the foregoing description, taken in connection with the accompanying drawings, it will be readily apparent to those skilled in the art to which an invention of the character described appertains, that I provide an improved manner of protecting motors against overheating and burn-outs wherein a single control device protects the motor under all conditions including the starting cycle and the running cycle, and wherein the operating characteristics of the protecting device are variable as a function of the speed of the motor and its operating conditions.

What I claim as my invention is:

1. The combination with a dynamo electric machine having an enclosing housing, and a circuit for supplying electric current thereto, of means active upon operation of the machine for creating a draft of ventilating air within the housing, a thermally actuated protective device for interrupting the supply circuit and including a resistance heating element electrically connected with the supply circuit to receive current therefrom, and means mounting the protective device on the dynamo electric machine so that the draft of ventilating air after being influenced by the thermal condition of the motor contacts directly with the heating element, whereby the temperature of the heating element produced by the passage of electric current therethrough is rapidly effected by the presence and absence of ventilating air and also by the temperature of the ventilating air.

2. The combination with a substantially enclosed electric translating machine and a current supply circuit therefor, of means for producing a ventilating draft of air within the machine enclosure, temperature responsive means for interrupting the supply circuit, and heating means for the temperature responsive means located within the translating machine enclosure and electrically connected with the supply circuit to be thermally affected by current flowing through the circuit and the ventilating air draft within the machine enclosure.

3. The combination with an electric translating machine having an enclosing housing, and a circuit supplying electric current thereto, of means for producing a flow of ventilating fluid to travel in a definite path within the enclosing housing and carrying off heat generated by the live parts of the translating machine, and means for controlling the supply of current to the machine including a thermal element and electrically connected with the current supply circuit, said thermal element being located within the enclosing housing at a point in said path of the ventilating fluid at which the temperature of the ventilating fluid is proportional to the thermal condition of the translating machine so that the temperature of the thermal element is proportional to the thermal condition of the translating machine.

4. The combination with an electric translating machine having an enclosing housing, and a circuit for connecting the machine with a source of E. M. F., of means for producing a flow of ventilating fluid to travel in a definite path within the enclosing housing to carry off heat generated by the live parts of the translating machine, and thermal means for interrupting the circuit connecting the translating machine with the source of E. M. F., said thermal means being located within the housing at a point in said path of the ventilating fluid directly following its passage over the live parts of the translating machine to be influenced by said flow of ventilating fluid.

5. In combination with an electric motor and a circuit for connecting the motor with a source of electric current, means for creating a draft of ventilating air within the motor upon operation thereof, and a protective device including a heating element electrically connected with the circuit, said protective device being carried by part of the motor with the heating element exposed to the draft of ventilating air within the motor.

6. The combination with an electric motor having means for producing a flow of ventilating air within its interior, and a circuit for connecting the motor with a source of E. M. F., of a device for interrupting the circuit to disconnect the motor from the source of E. M. F., and including a thermal element connected with the circuit to be influenced by current traversing the motor, and means mounting the protective device from a motor part with the thermal element located within its interior to be thermally influenced by the flow of ventilating air within the motor interior.

7. The combination with an electric translating device having an enclosing housing, and a circuit for connecting the translating device with a source of electric current, of means for creating a flow of ventilating air within the housing, a protective device for interrupting the circuit and including a thermal element connected with the circuit to be influenced by current traversing the translating device, and means mounting the protective device from the translating device housing with the thermal element located within the housing to be influenced by the flow of ventilating air therein.

8. The combination with an electric translating machine having means for creating a draft of ventilating air which enters the machine interior at one point and leaves the machine at another point, and a circuit for connecting the machine with a source of electric current, of a device for protecting the machine against burning out and including temperature responsive means for opening the circuit and a heating element connected with the circuit, to be influenced by current traversing the machine, and means mounting the device so that the ventilating air as it leaves the machine contacts directly with the heating element to rapidly influence the temperature thereof.

9. In combination with an electric motor, and a circuit for connecting the motor with a source of electric current, means operable during running of the motor for creating a draft of ventilating air to flow over the live parts of the motor and carry off heat generated thereby, and a protective device including a heating element electrically connected with the circuit and mounted with its heating element exposed to the draft of the ventilating air as it leaves the live parts of the motor.

10. The combination with an electric motor having means for producing a draft of ventilating air to flow in a definite path including a passage over the live parts of the motor whereby said draft of ventilating air is thermally influenced by the thermal condition of the motor and a circuit for connecting the motor with a source of E. M. F., of a device for interrupting the circuit to disconnect the motor from the source of E. M. F. and including a thermal element connected with the circuit to be influenced by current traversing the motor, and means mounting said device with its thermal element located in the path of the ventilating draft of air following its passage over the live parts of the motor whereby said thermal element is thermally influenced proportionately to the thermal condition of the motor by the flow of ventilating air.

11. The combination with an electric translating machine and a circuit for connecting the machine with a source of electric current, of a device for protecting the machine against burning out and including a temperature responsive means for opening the circuit and a heating element connected with the circuit to be influenced by current traversing the machine, and means for creating a draft of ventilating air to flow first over the live parts of the machine and then over the heating element of the protective device so that the influence of the current traversing the machine on the heating element is modified in accordance with the actual thermal condition of the machine.

In testimony whereof, I affix my signature.

GUSTAV O. WILMS.